United States Patent [19]
Hayashi

[11] Patent Number: 5,231,622
[45] Date of Patent: Jul. 27, 1993

[54] METHOD OF AND SYSTEM FOR CLEANING A FLOPPY DISK WITH AN IONIZING NEEDLE

[75] Inventor: Yoichi Hayashi, Kanagawa, Japan

[73] Assignee: Fuji Photo Film Co., Ltd., Kanagawa, Japan

[21] Appl. No.: 831,656

[22] Filed: Feb. 7, 1992

Related U.S. Application Data

[63] Continuation of Ser. No. 675,193, Mar. 26, 1991, abandoned.

[30] Foreign Application Priority Data

Mar. 26, 1990 [JP] Japan .................... 2-75881

[51] Int. Cl.⁵ .............................................. G11B 3/58
[52] U.S. Cl. ........................................ 369/73; 369/72; 15/1.51; 360/137
[58] Field of Search ............................ 369/71–72, 369/73, 74; 360/128, 137; 15/1.51, 306.1, DIG. 14

[56] References Cited

U.S. PATENT DOCUMENTS 4,083,073 4/1978 Bernardini .................. 369/72 X
4,198,061 4/1980 Dunn .......................... 369/73 X

FOREIGN PATENT DOCUMENTS

| 55-28522 | 2/1980 | Japan ................ 369/72 |
| 58-185003 | 10/1983 | Japan ................ 369/72 |
| 59-65901 | 4/1984 | Japan . |
| 62-270087 | 11/1987 | Japan . |
| 63-64685 | 3/1988 | Japan . |
| 1-312792 | 12/1989 | Japan ................ 369/73 |
| 2-42696 | 2/1990 | Japan ................ 369/72 |

Primary Examiner—Stuart S. Levy
Assistant Examiner—Joseph A. Rhoa
Attorney, Agent, or Firm—Sughrue, Mion, Zinn, Macpeak & Seas

[57] ABSTRACT

A floppy disk has a magnetic disk (1) accommodated in a casing provided with a head insertion opening. When cleaning the floppy disk, air in the casing is sucked through the head insertion opening while the magnetic disk is rotated and ionized air is blown toward the disk surface through the head insertion opening. An ionizing needle (13) ionizes the air before it hits the disc (1). Suction nozzles (12a and 12b) suck air away from the disc.

8 Claims, 3 Drawing Sheets

F I G . 2
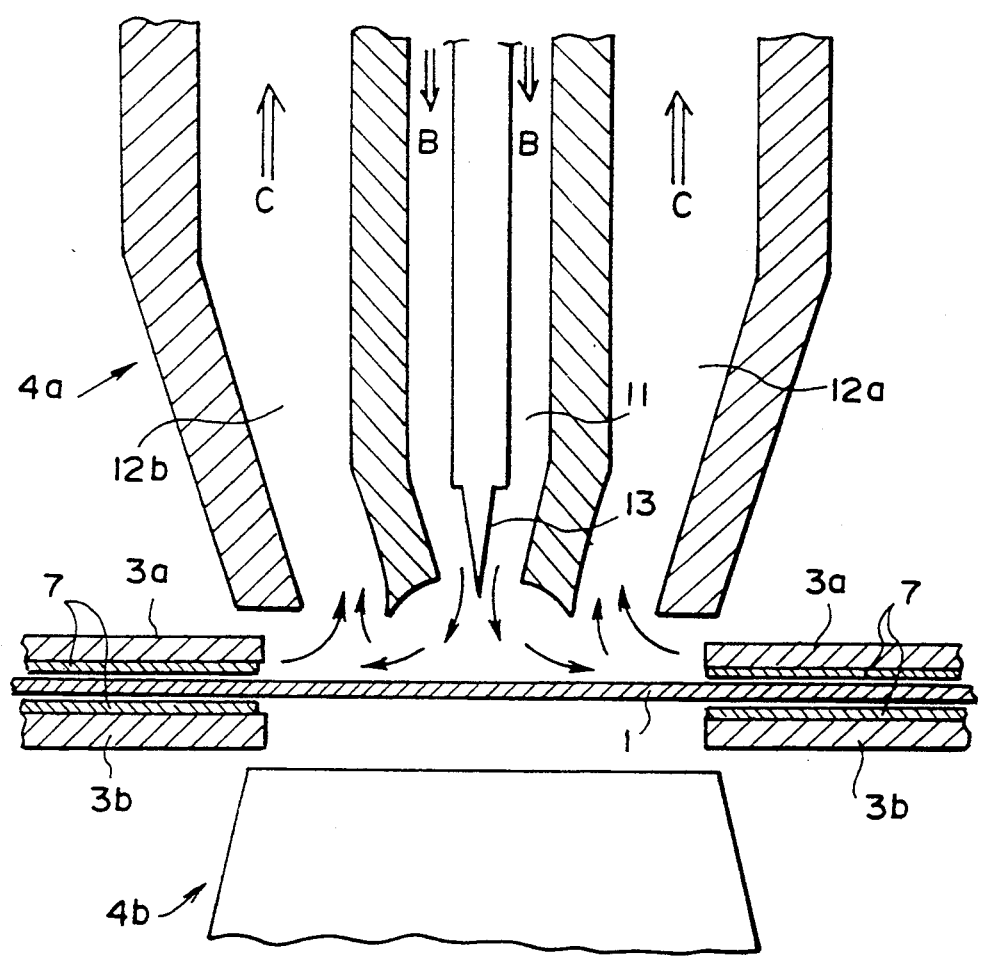

METHOD OF AND SYSTEM FOR CLEANING A FLOPPY DISK WITH AN IONIZING NEEDLE

This is a continuation of application Ser. No. 07/675,193, filed Mar. 26, 1991 now abandoned.

BACKGROUND OF THE INVENTION

1. Field of the Invention

This invention relates to a method of cleaning a floppy disk for clearing the floppy disk of dust adhering to the surface thereof in the manufacturing process thereof and a system for carrying out the method.

2. Description of the Prior Art

There has been known a floppy disk which is a flexible magnetic disk accommodated in a flat casing. The casing has a head insertion opening which gives access to the magnetic disk to the magnetic head of a recording and reproducing system. Dust can enter the casing through the head insertion opening and adhere to the surface of the disk. A liner typically made of nonwoven fabric is provided on the inner wall surface of the casing in order to wipe the dust from the surface of the disk while the disk is driven.

During assembly of the floppy disk, dust is produced due to various mechanical impacts. Especially, when upper and lower casing halves are welded together by an ultrasonic welding, the liner is vibrated by ultrasonic waves and a large amount of fine particles of components of the liner falls on the disk surface and adhere thereto as dust. Further dust wiped from the disk surface accumulates on the liner to a large amount and can fall on the disk surface when the casing is vibrated. When the floppy disk is loaded in the recording and reproducing system in such a state, a part of the dust can be trapped between the disk surface and the magnetic head and so-called drop out can occur.

It has been proposed to remove dust in the casing by sucking air in the casing through the head insertion opening while rotating the disk in the cleaning step of the manufacturing process, as disclosed in Japanese Unexamined Patent Publication Nos. 62(1987)-270087, and 63(1988)-64685, and the like.

However, the dust generated from the liner due to the ultrasonic welding is charged due to intense vibration and firmly adhere to the outer surface of the liner, the inner wall surface of the casing and the disk surface near the head insertion opening. It takes a long time to remove the charged dust by the air sucking, and accordingly, the manufacturing efficiency deteriorates.

SUMMARY OF THE INVENTION

In view of the foregoing observations and description, the primary object of the present invention is to provide a method of cleaning a floppy disk which can remove the charged dust in a short time.

Another object of the present invention is to provide a system for carrying out the method.

The method in accordance with the present invention is characterized in that air in the casing is sucked while ionized air is blown toward the disk surface through the head insertion opening, thereby eliminating charge from dust adhering to the outer surface of the liner, the inner wall surface of the casing and the disk surface near the head insertion opening.

The system in accordance with the present invention comprises an air suction means which is opposed to the head insertion opening and sucks air in the casing through the opening, an air blowing means which is opposed to the head insertion opening and blows air toward the disk through the opening, and an ionizing means which is disposed in an air flow produced by the air blowing means and ionizes the air.

In accordance with the present invention, the ionized air blown toward the disk eliminates charge from the dust on the surface of the disk, on the inner surface of the casing and on the liner. Accordingly the dust can be easily sucked out together with air in the casing.

BRIEF DESCRIPTION OF THE DRAWINGS

FIG. 2 is a fragmentary enlarged view showing a part of the system.

DESCRIPTION OF THE PREFERRED EMBODIMENT

Figure 1:
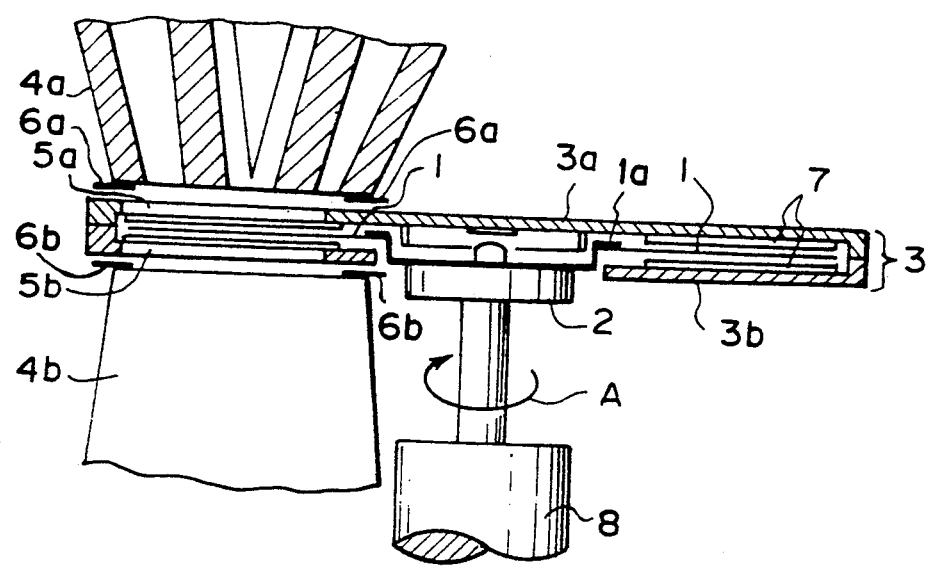
FIG. 1 is a cross-sectional view showing a floppy disk cleaning system in accordance with an embodiment of the present invention.

In FIG. 1, a floppy disk (e.g., 3.5" floppy disk) comprises a magnetic disk 1 accommodated in a casing 3. The magnetic disk 1 has a center core 1a formed of a magnetic material. The casing 3 is formed of upper and lower halves 3a and 3b respectively having head insertion openings 5a and 5b. Each head insertion opening has a length substantially equal to the width of the recording area of the magnetic disk 1. Reference numeral 7 denotes a liner.

A floppy disk cleaning system in accordance with an embodiment of the present invention comprises a rotating attachment 2 for rotating the magnetic disk 1, and a pair of nozzle assemblies 4a and 4b which are respectively opposed to the head insertion openings 5a and 5b of the casing 3 and sucks air in the casing 3 through the head insertion openings 5a and 5b while blowing ionized air on the surface of the magnetic disk 1 through the head insertion openings 5a and 5b.

The rotating attachment 2 is rotated by a spindle motor 8. The top portion of the rotating attachment 2 is formed of magnet and the center core 1a of the magnetic disk 1 is connected to the rotating attachment 2 under the magnetic force.

Figure 3:
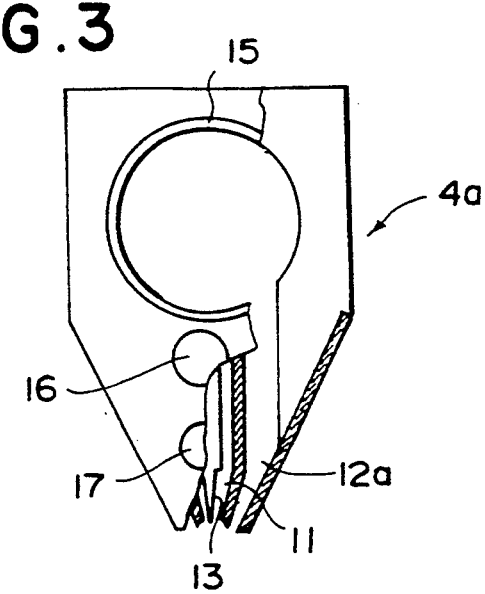
FIG. 3 is a front view partly in cross-section showing the nozzle employed in the system.
Figure 4:
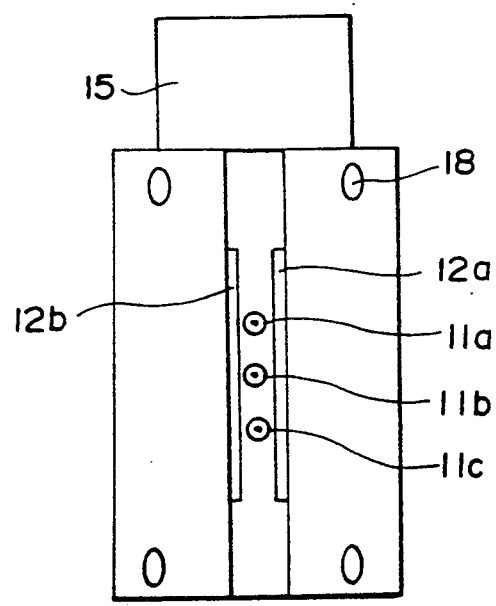
FIG. 4 is a bottom view of the nozzle.

As shown in FIGS. 2, 3 and 4, the nozzle assemblies 4a and 4b) comprise three blowing nozzles 11 (11a, 11b and 11c) which blow clean air on the magnetic disk 1 and are arranged in a row in a radial direction of the magnetic disk 1, an ionizing needle 13 which is disposed in each of the air blowing nozzles 11 and is applied with high alternating voltage, and a pair of suction nozzles 12a and 12b which are disposed on opposite sides of the air blowing nozzles 11 and suck air in the casing 3. Each of the suction nozzles 12a and 12b has an elongated suction port which extends substantially in a radial direction of the magnetic disk 1. When the suction ports extend in such a direction, even fragments of the liner 7 and the like adhering to the inner surface of the casing 3 can be sucked out and at the same time, since suction force is applied to the magnetic disk 1 over a relatively wide area in the radial direction thereof, the magnetic disk 1 is less apt to be deformed and the liners 7 are brought into a more close contact with the disk surface when the pressure in the casing 3 is reduced, whereby effect of cleaning by the liners 7 is improved. Each of the air blowing nozzles 11 extends to the suction port of the suction nozzles 12a and 12b so that the air blown out therefrom should not be directly sucked into the suction nozzles 12a and 12b. The suction nozzles 12a and 12b are connected to a suitable suction force. The air suction pressure applied to the suction nozzles 12a and 12b is preferably 300 to 800 mmH$_2$O. When the air suction pressure is larger than 800 mmH$_2$O, it becomes difficult to uniformly suck air over the entire length of the suction nozzles 12a and 12b and the magnetic disk 1 becomes apt to be deformed under the sucking force. The air sucking rate of each nozzle is generally set to 0.1 to 0.5 m$^3$/min.

The air blow rate of each air blowing nozzle is generally set to 1/10 to 2/1 of the air sucking rate. When the air blow rate is too large, dust can be forced into the casing 3 or cleaning effect of the liner 7 can be deteriorated.

The ionizing needle 13 is generally applied with a voltage of 1000 to 10000 v at a frequency of 10 to 200 Hz, and preferably 5000 v at 60 Hz.

The distance between the nozzle assemblies 4a and 4b and the magnetic disk 1 is generally 0.5 to 2.0 mm. In order to prevent deformation of the magnetic disk 1, the air suction pressures, the air sucking rates, the air blow rates and distances from the magnetic disk 1 of the respective nozzle assemblies 4a and 4b are set equal to each other.

Reference numeral 15 denotes a suction pipe which connects the suction nozzles 12a and 12b to the suction source such as a vacuum pump (not shown), a reference numeral 16 denotes a cable port for connecting a high voltage cable to the ionizing needle 13, and reference numeral 17 denotes an air supply port for supplying air under pressure. Further, reference numeral 18 denotes an elongated hole for mounting the nozzle assembly.

A pair of stoppers 6a and 6b locates the nozzle assemblies 4a and 4b in a predetermined position.

When cleaning the magnetic disk 1 with this system, the magnetic disk 1 is set on the rotating attachment 2. When the magnetic disk 1 is set on the rotating attachment 2, the nozzle assemblies 4a and 4b spaced from each other by a distance larger than that shown in FIG. 1 to facilitate setting the disk 1.

Thereafter, the nozzle assemblies 4a and 4a are moved toward each other until the leading edges thereof abut against the stoppers 6a and 6b to the position shown in FIG. 1 where the nozzle assemblies 4a and 4b are opposed to the head insertion openings 5a and 5b.

Then the spindle motor 8 is energized to rotate the disk 1 in the direction of arrow A in FIG. 1. The rotational speed of the disk 1 is generally 10 to 1000 rpm, and preferably 300 rpm. Then the air begins to be blown from the air blowing nozzles 11 in the direction of arrow B (FIG. 2), and thereafter, a predetermined high alternating voltage is applied to the ionizing needles 13. The reason why the high alternating voltage is applied to the ionizing needle 13 after the air blowing nozzles 11 begins to blow air is to prevent dust from adhering to the ionizing needle 13. About 0.1 seconds after beginning of application of the high alternating voltage to the needles 13, the suction nozzles 12a and 12b suck air in the direction of arrow C. Thus in this embodiment, the air blown from the air blowing nozzles 11 is ionized by the ionizing needles 13 and blown on the surface of the disk 1 and the liners 7 near the head insertion openings 5a and 5b. Dust on the parts on which the ionized air is blown is robbed of charge and is blown away from the parts. The dust blown away from the parts is sucked out of the casing 3 together with the air in the casing 3. Since the air sucking rate is larger than the air blow rate, not only the blown dust but also dust on the surface of the disk 1 and dust on the liners 7 are sucked away therefrom.

Generally cleaning is effected for a time interval in which the disk 1 makes at least three turns. It is preferred that cleaning is carried out in atmosphere where the humidity is not lower than 50% in order to reduce charge of the dust.

The present invention can also be applied to any disk which differs from the disk described in the embodiment described above in diameter, shape and the like.

The rotational speed of the disk 1, the air sucking rate and the cleaning time need not be limited to those described above, and also the voltage and the frequency of the high alternating voltage need not be limited to those described above, but they may be changed according to the amount of dust or other factors.

Though in the embodiment described above, the nozzle assemblies 4a and 4b are positioned in the retracted position when the disk 1 is set on the rotating attachment 2 in order to facilitate setting of the disk 1 and then moved toward the disk 1, the assemblies 4a and 4b may be fixed in the position shown in FIG. 1 and the rotating attachment 2 carrying thereon the disk 1 may be moved in a radial direction of the disk 1 to insert the disk 1 between the assemblies 4a and 4b.

I claim:

1. A system for cleaning a floppy disk having a magnetic disk accommodated in a casing provided with a head insertion opening, comprising:
   a disk rotating means for rotating the disk accommodated in said casing;
   an air suction means which is opposed to the head insertion opening and sucks air from the casing through the opening;
   an air blowing means which is opposed to the head insertion opening for blowing air toward the disk through the opening at a rate lower than a rate at which said suction means suctions from said casing, said air blowing means including an elongated tube which terminates in a nozzle portion adjacent said opening; and
   an ionizing means disposed at least partially disposed in said elongated tube at a position upstream of said disk and terminating proximate said nozzle portion such that the air first contacts said ionizing means before contacting any portion of said disk, said ionizing means ionizing the air.

2. A system as defined in claim 1 in which said ionizing means comprises an ionizing needle which is applied with a high alternating voltage.

3. A system as defined in claim 2 in which said air suction means comprises an elongated suction port which extends substantially in a radial direction of the magnetic disk.

4. A system as defined in claim 2 in which said air suction means comprises a pair of elongated suction ports each extending substantially in a radial direction of the magnetic disk, and said air blowing means is disposed between the suction ports.

5. A system as defined in claim 4 in which said air blowing means has a plurality of air blow ports arranged in a row extending substantially in a radial direction of the magnetic disk.

6. A system as defined in claim 2 in which a high alternating voltage begins to be applied to the ionizing needle after the air blowing means begins to blow air.

7. The system as defined in claim 1, wherein said air blowing means, air suction means and ionizing means are all symmetrically disposed on opposite sides of said disk such that said ionized air is blown against opposite sides of said disk and suctioned therefrom.

8. The system as defined in claim 1, wherein said air suctioning means substantially circumscribes said air blowing means.

* * * * *